United States Patent Office 3,394,392
Patented July 23, 1968

3,394,392
PHOTOGRAPHIC PLATE BASED ON FURFURYLIDENE AND USING POLYPHENYLENE OXIDE RESIN BINDER
John Alan Mattor, Hollis, Maine, assignor, by mesne assignments, to Scott Paper Company, Delaware County, Pa., a corporation of Pennsylvania
No Drawing. Filed Mar. 29, 1967, Ser. No. 626,718
6 Claims. (Cl. 96—90)

ABSTRACT OF THE DISCLOSURE

The solvent soluble film-forming polyphenylene oxide resins have been found to be unexpectedly superior binders for photographic plates containing a furfurylidene as the color-former, an aromatic amine as an enhancer, and a lower haloalkane (iodoform) as a sensitizer for light. Such plates can be developed after exposure by simple heating.

RELATED APPLICATION

See application Ser. No. 351,316, "Photosensitive Mediums Comprising a Furfurylidene, a Primary Aromatic Amine, and a Lower Haloalkane" filed in the names of Mattor and Price on Mar. 12, 1964, and which is to be abandoned in favor of its continuation-in-part application, Ser. No. 641,720, filed Apr. 21, 1967, the disclosure of which is incorporated by reference.

SUMMARY OF THE INVENTION

It has now been found that the polyphenylene oxide (PPO) resins are unexpectedly superior binders for photographic members containing a purified (98% purity) furfurylidene, a primary aromatic amine and a halohydrocarbon as the active ingredients. These chemicals are fully described in the above application. The PPO resins display a superior ability to retain the photographic chemicals, principally the haloalkane (iodoform) so that the shelf life of the plates is some 5 to 10 times that of plates made with the common film-forming binders such as the polystyrenes and methyl methacrylates. The PPO resins also appear to be better able to resist the heat, above 100° C., that is required to develop the plates after they have been exposed. Poly (2,6-dimethyl phenylene) oxide (General Electric's PPO) having a degree of polymerization in the range of 80 has been used.

Any common solvent in which the PPO resin is soluble can be used to apply the photographic medium. Chloroform has so far been found to be most suitable. The PPO resin can be mixed with other resin binders such as the polystyrenes, polymethylmethacrylates, and styrene acrylics to improve such properties as its bind to supporting substrates. Generally speaking, the PPO will make up a predominate part, i.e., more than 50% of the resin component of the photographic medium. Plasticizer in the amount of 0 to 100 weight percent based on resins can be incorporated in the photographic medium. Examples are Monoplex S-90E (Rohm & Haas), triphenyl phosphate, dioctyl phthalate and chlorinated praffins.

The concentration of the photographic medium in the coating solution is such as to give the desired coating viscosity and film thickness. Normally the concentration of the resins in the solvent or solvents will be 10 to 20 weight percent. The resin is normally used in an amount of 1 to 40 parts by weight based on the furfurylidene. The aromatic amine is used in an amount of about 0.1 to 4 parts by weight based on furfurylidene and the haloalkane 0.1 to 20 parts by weight based on the furfurylidene. Coatings weights are in the range of 2 to 7 pounds per ream (3300 square feet). The photographic medium can be carried as a thin film on a support, e.g. a paper coated with a subcoating having good solvent hold-out, or a thin paper body stock can be impregnated with the photographic medium.

PREFERRED EMBODIMENTS

The following coatings were applied by a Mayer bar in an amount of 4 pounds per ream (dry basis) to 0.003 inch thick films of polyethylene terephthalate (duPont's Mylar) without a subcoating and with a primary subcoating. The thus obtained transparent photographic films when exposed 5 seconds through a negative to a carbon arc at a distance of 24 inches and subsequently heat developed in hot air at 150° C. gave good copies.

TABLE I

| Example | I | II | III | IV | V |
| --- | --- | --- | --- | --- | --- |
| Iodoform, g | 600 | 600 | 450 | 600 | 600 |
| Difurfurylidene Pentaerythritol | 600 | 600 | 600 | 600 | 600 |
| 2,4-diamino-1-chlorobenzene | 450 | 450 | 450 | 300 | 450 |
| M-phenylenediamine | 180 | 90 | 90 | 90 | 180 |
| PPO Binder (General Electric) | 1,200 | 1,200 | 6,000 | 600 | 1,200 |
| Chloroform, ml | 5,700 | 4,500 | 9,000 | 4,670 | 9,000 |
| 1,1,2-trichloroethane, ml | | 4,500 | | | |
| Monoplex S90 E (Rhom & Haas), g | 300 | | | | |
| Chlorowax 70 (Diamond Chemical) | | 1,200 | 600 | | |
| Triphenyl Phosphate, g | | | | 150 | |
| Dioctyl Phosphate, g | | | | | 300 |

A translucent plate was made by impregnating an uncoated 30 pounds per ream paper web moderately sized with resin but containing no clay filler with a solution consisting of 400 g. iodoform, 200 g. difurfurylidene pentaerythritol, 300 g. 2,4-diamino-1-chlorobenzene, 60 g. m-phenylendiamine, 400 g. PPO resin and 7280 ml. chloroform. The plate was dried about 5 minutes in still air and was then ready for use.

An opaque plate was made by coating a 70 pounds per ream weight paper base coated with 20 pounds per ream of a conventional cast casein-clay subcoating with 5 pounds per ream of the following solution: 0.05 g. 2-furyl-5-methyl-5-furfurylideneimino-1, 3-dioxane; 0.05 g. iodoform; 0.05 g. 2, 4 toluenediamine, 4 ml. of 10% PPO (General Electric's) in chloroform. After drying, it was exposed 20 seconds to a 625-watt Sylvania Sun-Gun at a distance of 12 inches through a negative followed by heating to 300° F. to produce a brown-black image.

The bonding of the coatings to films of polyethylene terephthalate is improved by coating the plastic film with a subbing such as polyvinyl acetate-maleate copolymer in a blend of isopropyl acetate and toluene, (Monsanto's Gelva Multipolymer Solution 269), which was the primary coating used in the above example.

I claim:
1. In a photographic medium comprising a light-passing binder containing dispersed therein in image producing amounts and proportions:
 (a) as a color former, a purified furfurylidene,
 (b) as an enhancer, a primary aromatic amine,
 (c) as a sensitizer, a photosensitive lower haloalkane; the improvement wherein said binder consists predominately of a solvent soluble, film-forming polyphenylene oxide resin.
2. The photographic medium of claim 1 wherein said polyphenylene oxide resin is poly(2,6-dimethyl phenylene) oxide.
3. A photographic plate consisting of the photographic medium of claim 1 carried as a thin film on a support.

4. The photographic plate of claim 3 wherein support is a plastic film coated with a subbing that improves the bonding of said thin film.

5. A translucent photographic plate consisting of a paper sheet impregnated with the photographic medium of claim 1.

6. The photographic medium of claim 1 wherein said lower haloalkane is iodoform.

References Cited
UNITED STATES PATENTS

| | | | |
|---|---|---|---|
| 3,147,117 | 9/1964 | Wainer et al. | 96—90 |
| 3,202,507 | 8/1965 | Sprague et al. | 96—90 |

NORMAN G. TORCHIN, *Primary Examiner.*

C. E. DAVIS, *Assistant Examiner.*